(12) United States Patent
Pilkington et al.

(10) Patent No.: US 10,805,213 B2
(45) Date of Patent: Oct. 13, 2020

(54) CONTROLLING DATA COMMUNICATION BETWEEN MICROSERVICES

(71) Applicant: International Business Machines Corporation, Armonk, NY (US)

(72) Inventors: Adam J. Pilkington, Eastleigh (GB); Graham C. Charters, Hampshire (GB); Gordon Hutchison, Eastleigh (GB); Timothy J. Mitchell, Chandlers Ford (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/194,697

(22) Filed: Nov. 19, 2018

(65) Prior Publication Data

US 2020/0162380 A1 May 21, 2020

(51) Int. Cl.
*H04L 12/721* (2013.01)
*H04L 12/725* (2013.01)
*H04L 12/751* (2013.01)
*H04L 12/851* (2013.01)

(52) U.S. Cl.
CPC .............. *H04L 45/70* (2013.01); *H04L 45/02* (2013.01); *H04L 45/306* (2013.01); *H04L 47/2483* (2013.01)

(58) Field of Classification Search
CPC . H04L 41/50; H04L 41/5003; H04L 41/5006; H04L 41/5009; H04L 41/5016; H04L 41/5019; H04L 41/5022; H04L 43/08; H04L 45/00; H04L 45/02; H04L 45/021; H04L 45/025; H04L 45/026; H04L 45/028; H04L 45/70; H04L 45/306; H04L 45/308; H04L 45/3065; H04L 12/721; H04L 12/725; H04L 12/751;
(Continued)

(56) References Cited

U.S. PATENT DOCUMENTS

| 8,862,680 | B2 | 10/2014 | Van Wyck Gould | |
|---|---|---|---|---|
| 9,215,159 | B2 * | 12/2015 | Raleigh | H04L 65/607 |
| 9,363,301 | B2 * | 6/2016 | Lawson | H04L 65/403 |

(Continued)

OTHER PUBLICATIONS

"Designing Microservices: Interservice Communication". Interservice communication in microservices | Microsoft Docs. Dated Dec. 7, 2017. Seven pages. (https://docs.microsoft.com/en-us/azure/architecture/microservices/interservice-communication>.

(Continued)

*Primary Examiner* — Tri H Phan
(74) *Attorney, Agent, or Firm* — Edward Li

(57) ABSTRACT

In a cluster of microservice nodes, each microservice node comprises a microservice and microservices form a service mesh. Data communications across the service mesh are controlled to prioritize sequence in which various data parameters are sent to destination nodes, so that data needs of a destination microservice are met as quickly as possible. An originator program receives, from a destination, data usage information relating to access of the data parameters received by a destination program from the originator program. The originator program determines, for the destination microservice, a priority order of the data parameters based on the historic data usage information, and transmits input data in the priority order to the destination program.

23 Claims, 6 Drawing Sheets

(58) Field of Classification Search
CPC ... H04L 12/851; H04L 47/10; H04L 47/2475; H04L 47/2483; H04L 47/2491; H04L 67/327
See application file for complete search history.

(56) References Cited

U.S. PATENT DOCUMENTS

| | | | |
|---|---|---|---|
| 9,407,546 B2 | 8/2016 | Nguyen | |
| 9,509,782 B2 | 11/2016 | Lawson | |
| 9,538,417 B1 | 1/2017 | Chokshi | |
| 9,887,876 B2* | 2/2018 | Kumar | H04L 47/70 |
| 9,906,607 B2* | 2/2018 | Lawson | H04L 61/308 |
| 10,048,830 B2* | 8/2018 | Jose | G06F 3/04817 |
| 10,255,052 B2* | 4/2019 | Bagarolo | G06F 11/302 |
| 10,360,012 B2* | 7/2019 | De Capoa | G06F 9/44505 |
| 10,541,893 B2* | 1/2020 | Nainar | H04L 43/062 |
| 2019/0064787 A1* | 2/2019 | Maturana | G05B 23/0283 |
| 2019/0273746 A1* | 9/2019 | Coffing | H04L 9/3213 |
| 2020/0052982 A1* | 2/2020 | Nainar | G06F 9/44521 |

OTHER PUBLICATIONS

Fernando "Understanding Microservices Communication and Service Mesh". Dated Dec. 15, 2017. Six pages.<https://medium.com/microservices-learning/understanding-microservices-communication-and-service-mesh-e888d1adc41>.
Indrasiri "Service Mesh for Microservices". Service Mesh for Microservices—Microservices in Practice—Medium. Sep. 15, 2017. Nine pages. (https://medium.com/microservices-in-practice/service-mesh-for-microservices-2953109a3c9a>.

* cited by examiner

CONTROLLING DATA COMMUNICATION BETWEEN MICROSERVICES

BACKGROUND

The present invention relates generally to microservices linked by a service mesh, and more particularly to controlling data communication between microservices across a service mesh of microservice nodes.

Service meshes (such as Istio™) involve sending large amounts of structured parameter information between stateless microservices. An issue with service meshes is that receiving microservice has to wait until all the data it needs has arrived before the service code can be invoked. For example, 10 MB of JSON data about a consumer (e.g. customer) may be passed from one microservice to several other microservices. The data package is typically large if it contains the consumer's order history, as well as parameters such as consumer's address. Receiving microservices have to wait until they receive all the data before executing the application logic, even if all they do is access one parameter (such as the address data).

Current proxy solutions attempt to start early by allowing processing to start before all the data has arrived, but will block if data is requested that has not been received.

SUMMARY

The present invention provides a computer-implemented method for prioritizing the order in which data is sent across the service mesh so as to enable the destination microservices to receive and to start processing the data they need as early as possible.

The present invention further provides a computer program product including computer program code for implementing a proposed method when executed by a processing unit.

The present invention also provides a processing system adapted to execute this computer program code.

The present invention also provides a computer system comprising microservice nodes configured for receiving the data they need across a service mesh as early as possible.

According to an aspect of the invention, there is provided a computer-implemented method for controlling data communication between microservices across a service mesh of microservice nodes. The method comprises, at a destination microservice node for performing an associated service for an originating microservice node, controlling an associated destination program to generate data usage information at the destination microservice node. The method also includes transmitting, across the service mesh, the data usage information from the destination program to an originator program associated with the originating microservice node. Also, the method includes controlling the originator program to determine, for the destination microservice node, a priority order of input data based on the data usage information. The method yet further includes transmitting, across the service mesh, the input data in the priority order from the originator program to the destination microservice node for performing the associated service on the input data.

Proposed is a concept of prioritizing the order in which input data is transmitted to a destination microservice, so to enable the destination microservice to start executing as soon as possible for example. Proposed embodiments may therefore enable a service mesh to operate more efficiently and quickly than before, by ensuring that an originating microservice is more likely to deliver the data parameters that a particular microservice will require before other data parameters that only other microservices may require. Embodiments may avoid the need for the receiving microservices to wait until they have received all the necessary data before executing the logic of their applications.

Each microservice node of the service mesh may be selectively operable as an originating microservice node and as a destination microservice node. Further, the method may comprise: an originating microservice node receiving across the service mesh the data usage information from each destination program to which it has sent input data; and determining a priority order of the input data for each respective destination program.

In this way, each node that may transmit data can build up historic usage data from all the other nodes to which it has sent data and to which it may therefore in future need to send data.

The input data may comprise data parameters relating to different respective attributes of a consumer for whom services are performed by the service mesh, and the originator program may transmit the input data with the data parameters in the priority order based on the data usage at the destination microservice node of those data parameters.

This enables the system to be used to perform tasks for consumers based on the consumers' attributes.

In some embodiments, the input data may comprise different data parameters and the destination microservice node may create a data proxy for each of the data parameters. Further, each data proxy may record any access by the destination microservice of its respective data parameter, and the associated destination program may use the data proxies to generate the data usage information relating to data access requirements at the destination microservice node.

This enables the system to generate the usage data for sets of data parameters, for example structured data such as JSON or XML, so as to identify which elements within the data hierarchy are accessed.

In an embodiment, the originator program may determine the identities of one or more destination microservice nodes to which the input data is to be transmitted for the performance of a microservice, by inspecting the input data or by querying the service mesh.

This is consistent with the normal operation of a service mesh, in which data is sent to one or more identified destinations.

Some embodiments may further comprise the originator program updating, for each individual destination microservice node, the respective priority order based on updated data usage information relating to the use of data by the destination microservice node.

This ensures that the priority order is kept as current as possible, to minimize the time within which the nodes are able to start and thus complete their microservices.

According to another aspect of the invention, there is provided a computer-implemented method performed by a destination microservice in a cluster of microservice nodes forming a service mesh. The method comprises a destination program of the destination microservice generating data usage information relating to its access of input data comprising specific different data parameters received across the service mesh from an originator program, the usage information based on the access of the different data parameters. The method also comprises the destination program transmitting, across the service mesh, the data usage information to the originator program.

The destination microservice may create a data proxy for each of the data parameters, each data proxy recording any access by the destination microservice of its respective data parameter, the associated destination program using the data proxies to generate the data usage information at the destination microservice.

This leverages the existing functionality of some service meshes, avoiding the need to make substantial changes to code.

In some embodiments, the data parameters may be different respective attributes of a consumer for whom services are performed by the service mesh.

This enables the system to be used to perform tasks for consumers based on the consumers' attributes.

According to yet another aspect of the invention, there is provided a computer-implemented method performed by an originating microservice in a cluster of microservice nodes forming a service mesh. The method comprises an originator program of the originating microservice receiving, across the service mesh from a destination program of a destination microservice, data usage information relating to the access of input data comprising specific different data parameters received by the destination program from the originator program, the usage information based on the access of the different data parameters. The method also comprises the originator program determining, for the destination microservice, a priority order of input data parameters based on the data usage information. The method further comprises the originator program transmitting, across the service mesh, the input data in the priority order to the destination program for performing the associated service on the input data.

The data parameters may be different respective attributes of a consumer for whom services are performed by the service mesh.

This enables the system to be used to perform tasks for consumers based on their attributes.

According to yet another aspect of the invention, there is provided a computer program product for controlling data communication across a service mesh. The computer program product comprises a computer readable storage medium having program instructions embodied therewith, the program instructions executable by a processing unit to cause the processing unit to perform: at a destination microservice node for performing an associated service for an originating microservice node, control an associated destination program to generate data usage information at the destination microservice node; transmit, across the service mesh, the data usage information from the destination program to an originator program associated with the originating microservice node; control the originator program to determine, for the destination microservice node, a priority order of input data based on the data usage information; transmit, across the service mesh, the input data in the priority order from the originator program to the destination microservice node for performing the associated service on the input data.

According to yet another aspect of the invention, there is provided a computer network comprising microservice nodes configured to communicate across a service mesh, the microservice nodes being configurable as originating microservice nodes and as destination microservice nodes. Each destination microservice node is configured to: perform an associated service for an originating microservice node; control an associated destination program to generate data usage information at the destination microservice node; and transmit, across the service mesh, the data usage information from the destination program to an originator program associated with the originating microservice node. Each originating microservice node is configured to: control the originator program to determine, for the destination microservice node, a priority order of input data based on the data usage information; and transmit, across the service mesh, the input data in the priority order from the originator program to the destination microservice node for performing the associated service on the input data.

According to yet another aspect of the invention, there is provided a computer system configured as a destination microservice node in a cluster of microservice nodes forming a service mesh. A destination program of a destination microservice of the destination microservice node is configured to generate data usage information relating to its access of input data comprising specific different data parameters received across the service mesh from an originator program, the usage information being based on the access of the different data parameters. The destination program is configured to transmit, across the service mesh, the data usage information to the originator program.

According to yet another aspect of the invention, there is provided computer system configured as an originating microservice node in a cluster of microservice nodes forming a service mesh. An originator program of an originating microservice of the originating microservice node is configured to receive, across the service mesh from a destination program of a destination microservice of a destination microservice node, data usage information relating to the access of input data comprising specific different data parameters received by the destination program from the originator program, the usage information based on the access of the different data parameters. The originator program is configured to determine, for the destination microservice, a priority order of input data parameters based on the data usage information. The originator program is also configured to transmit, across the service mesh, the input data in the priority order to the destination program for performing the associated service on the input data.

In proposed that an originator program may prioritize the data parameters for each destination node, and that a destination program may generate data usage information relating to the access of input data at each destination node. The originator program and the destination program at any microservice node may thus have different functions, but it will be understood that they may both be present at any or all of the nodes, and that they may take a variety of forms. It may be the same program that fulfils both functions, by recording data access and re-ordering data transmission. Each of these programs may be a component, a service or a proxy through which data flows between microservices. The usage analysis and the prioritization function that results in the re-ordering of the data parameters in the transmissions may be carried out as part of an application that executes at the node, or part of the application server, or as another process in the same container.

In an example, the microservice mesh may be an Istio™ mesh. As is well known, an Istio™ service mesh is logically split into a data plane and a service plane. The data plane is composed of a set of intelligent proxies deployed as sidecars—these may be known by the name Envoy. They mediate and control the network communication between the microservices. The control plane is an API that manages and configures the proxies in order to route traffic. Accordingly, proposed embodiment may be used in an Istio™ mesh by suitable programming. The originator and destination programs may then be processes in the same container as the sidecar proxy.

Alternatively, the programs may be processes in another container within a Kubernetes® pod. Kubernetes® is an open-source container-orchestration system for automating deployment, scaling and management of containerized applications. Currently, the main current options for service meshes in Kubernetes® are Linkerd™ and Istio™.

There may be provided a computer network for performing a distributed service, comprising a cluster of multiple microservice nodes communicating over a service mesh providing a proxy at each microservice node for the transmission of data between the microservice nodes, in which each proxy stores data usage information indicative of the priorities of the need for different parameters of the data at each of the microservice nodes, wherein:

(i) an originating microservice node is configured to receive input data relating to services to be performed by at least one destination microservice node in the cluster;

(ii) the proxy at the originating microservice node is configured to determine the identities of the one or more destination micro service nodes;

(iii) the proxy at the originating microservice node is configured to place in priority order, for each destination microservice node, the parameters of data in the input data, based on data usage information relating to the use of those parameters of data by the destination microservice node;

(iv) the proxy at the originating microservice node is configured to transmit across the service mesh to each destination microservice node the input data in the associated priority order;

(v) the proxy at the destination microservice node or at each destination node is configured to identify which data parameters are used by its microservice and to transmit this data usage information across the service mesh to the originating microservice node; and (vi) the proxy of the originating microservice node is configured to update its data usage information using the data usage information received from the destination microservice node or nodes.

This may provide similar advantages to the other aspects described above, by enabling distributed tasks to be executed independently at nodes of a network and to start execution as early as possible, by predicting their data input requirements based on their historic data usage, and prioritizing the transmission of those data types or parameters. The step of determining the identity of the destination node or nodes enables the prioritization to be made for those nodes, even though the service mesh may send the same transmission from the originating node to all the nodes. It may also be used where tasks are performed sequentially in multiple hops over the mesh.

DETAILED DESCRIPTION

Figure 1:
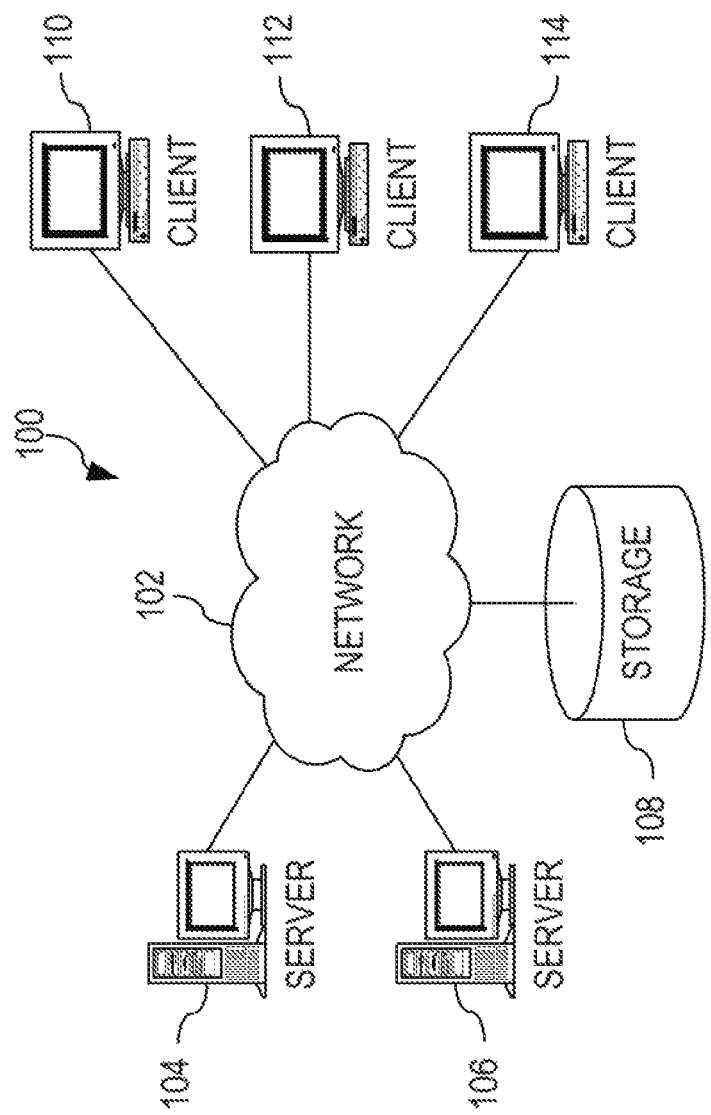
FIG. 1 depicts a pictorial representation of an example distributed system in which aspects of the illustrative embodiments may be implemented.

It should be understood that the Figures are merely schematic and are not drawn to scale. It should also be understood that the same reference numerals are used throughout the Figures to indicate the same or similar parts.

In the context of the present application, where embodiments of the present invention constitute a method, it should be understood that such a method may be a process for execution by a computer, i.e. may be a computer-implementable method. The various steps of the method may therefore reflect various parts of a computer program, e.g. various parts of one or more algorithms.

Also, in the context of the present application, a system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Proposed is a concept of prioritizing the order in which different parameters of input data are transmitted, and this may enable a receiving microservice to start executing as soon as possible. The prioritization may be based on historic usage of the specific data parameters by the destination microservice. By way of example, the parameters that have been used the most may be given priority, since they are more likely to be needed before other data parameters. The destination microservice that receives the data will be able to start execution once it has received the parameters it needs, which may not be all of the parameters that are sent over a service mesh by an originating microservice.

In a cluster of microservice nodes, each microservice node comprises a microservice and the microservices form a service mesh, e.g., with the use of proxies. Data communications across the service mesh may be controlled to prioritize the sequence in which various data parameters are sent to destination nodes, so that the data needs of a specific destination microservice are met as quickly as possible. An originator program (e.g., proxy) may receive, from a destination program (e.g., proxy), data usage information relating to the access of the different data parameters received by the destination program from the originator program. The originator program may determine, for the destination microservice, a priority order of the data parameters based on the historic data usage information, and then transmit the input data in the priority order to the destination program.

In this way, an originating program may prioritize the order (i.e., the sequence) of its transmission of data parameters over the service mesh to one or more destination microservices, based on its assessment of the needs of the (or each) destination microservice for specific parameters in order for it to perform its microservice.

The originating program may accumulate historic data usage of each parameter by each destination microservice to which it has sent data. It may use this to prioritize the order of transmission of the next set of data over the service mesh, and it may continually update this prioritization as it receives new usage data. New patterns of data access may be the result of the deployment of new service versions at the nodes, for example. This updating may help to ensure that the order is optimal, so that the microservices can be executed as early as possible by the cluster for example.

Expressed another way, the time that each microservice has to wait before it has received all the items of data it needs to perform its specific microservice may be minimized, based on the knowledge of its specific needs stored at each originating microservice node.

Thus, embodiments provide a computer-implemented method for controlling data communication between microservices across a service mesh of microservice nodes. An exemplary embodiment comprises, at a destination microservice node for performing an associated service for an originating microservice node, controlling an associated destination program to generate data usage information at the destination microservice node. It transmits, across the service mesh, the data usage information to an originator program associated with the originating microservice node. The originator program determines, for the destination microservice node, a priority order of input data based on the data usage information. It transmits, across the service mesh, the input data in the priority order to the destination microservice node for performing the associated service on the input data.

As will be understood, each microservice node of the service mesh is normally selectively operable as an originating microservice node and as a destination microservice node. An exemplary proposed method may then comprise an originating microservice node receiving across the service mesh the data usage information from each destination program to which it has sent input data, and determining a priority order of the input data for each respective destination program.

The input data may, for example, comprise different data parameters, and the data parameters may, for example, relate to different respective attributes of a consumer for whom services are performed by the service mesh. Examples may be the consumer's name, address, and account number. In embodiments, the originator program may transmit the input data with the data parameters in the priority order based on the data usage at the destination microservice node of those data parameters. This may enable the data communication to be ordered with a detailed level of prioritization, by considering the usage of individual parameters by different microservices.

In embodiments, the service mesh may be an Istio™ mesh. The service mesh may comprise a proxy at each node, and this proxy may be an Envoy sidecar, for example, for data communication across the mesh. Such embodiments may enable existing meshes with their deployed applications to be used without rewriting their code.

As indicated, the input data may comprise different data parameters. Preferably, the destination microservice node creates a data proxy for each of the data parameters, each data proxy recording any access by the destination microservice of its respective data parameter. The associated destination proxy may then use the data proxies to generate the data usage information relating to data access requirements at the destination microservice node. This may leverage the existing functionality of existing service meshes and related system programs. For example, the service mesh may be an Istio™ mesh, and Liberty™ may be deployed into this mesh for the collection of data usage information. There may typically be a data/statistics collection section and a data transmission section within the microservice proxy established at each node by the service mesh.

As is normal in the operation of service meshes such as Istio™, the originator proxy may determine the identities of one or more destination microservice nodes to which the input data is to be transmitted for the performance of a microservice, by inspecting the input data or by querying the service mesh.

To ensure that the prioritization is current, it may be preferred that the originator program update, for each individual destination microservice node, the respective priority order based on updated data usage information relating to the use of data by the destination microservice node.

In an embodiment, the destination microservice may create a data proxy for each of the data parameters, each data proxy recording any access by the destination microservice of its respective data parameter. The associated destination proxy may use the data proxies to generate the data usage information at the destination microservice. In an example, a Liberty™ web or a Contexts and Dependency Injection for Java® EE, CDI, container deployed into the service mesh, such as the Istio™ mesh, creates the data proxies upon receipt of the data parameters. It can then compile the data access, i.e., usage locally, of each separate data parameter by the microservice.

This feature may leverage the capabilities of the architecture that may already be in place, without needing to change the code of the mesh, in order to manage efficiently the recording of accesses at a node to the different respective data parameters. The data parameters may be different respective attributes of a consumer for whom services are performed by the service mesh. In this way, the invention may be applied to services for consumers, e.g., consumers of a bank or a store.

Embodiments of the present invention may mitigate the problems in conventional approaches that caused a microservice to block if data is requested that has not been received. By prioritizing the data transmission order from originator proxies based on the historic usage of data and thus on the needs of the individual destination microservices, it becomes more likely that the microservices can start earlier. This in turn means that the overall task to be performed by the cluster of microservices is more likely to be completed earlier. There are likely to be fewer blocks.

Embodiments of the present invention may employ existing available characteristics of a service mesh such as Istio™ to change the order in which structured data is sent between microservices in the mesh. For instance, when data is first received by the microservice, it may create separate proxies for all the data items received. These proxies may not only monitor whether or not the parameter was actually accessed, but also monitor, in the case of structured data such as JSON or XML, which elements within the data hierarchy are accessed. These are the data parameters referred to above. This access information may be sent back to the sidecar process, also referred to as the proxy, provided by the service mesh, which in turn sends that information back to the originating service's sidecar or proxy. Note that the statistics of the data usage flow between service sidecars provided by the mesh, rather than between the microservices themselves.

Existing architecture may therefore be leveraged, without the need to rewrite code.

In an embodiment, once the statistics, i.e., the data usage information, have been collated, then the sidecar process or proxy of the sending microservice, i.e., the originating microservice, may start to re-order the data that is sent to microservices that it has statistical information for. The data that is most likely to be accessed may be put at the start of parameters sent to the service. As this is a mesh, the re-ordering may be specific to each receiving microservice rather than being a single re-ordering for all microservices. All the data may still sent to each microservice, so in the event that data is requested by a microservice for the first time, its proxy will just block until the data it needs arrives, i.e., there is no failure path. Statistics are collected allowing a feedback loop to change the re-ordering, i.e., the priority order of data parameters in the event of new data accesses due to a new service version being deployed.

Benefits of the embodiments may include the feature that microservices can start processing requests immediately as the data they need is already available. Further, no code changes are needed to deploy the invention, as the invention can work with existing applications deployed to a service mesh.

FIG. 1 depicts a pictorial representation of an exemplary distributed system in which aspects of the illustrative embodiments may be implemented. A distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, first server 104 and second server 106 are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. The clients 110, 112, and 114 are clients to the first server 104 in the depicted example. The distributed processing system 100 may include additional servers, clients, and other devices which are not shown in FIG. 1.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, comprising thousands of commercial, governmental, educational, and other computer systems that route data and messages. The distributed system 100 may also be implemented to include a number of different types of networks, such as an intranet, a local area network (LAN), a wide area network (WAN), or the like. As stated above, FIG. 1 is intended as an example, not as an architectural limitation for different embodiments of the present invention; therefore, the particular elements shown in FIG. 1 should not be considered limiting with regard to the environments in which the illustrative embodiments of the present invention may be implemented.

Figure 2:
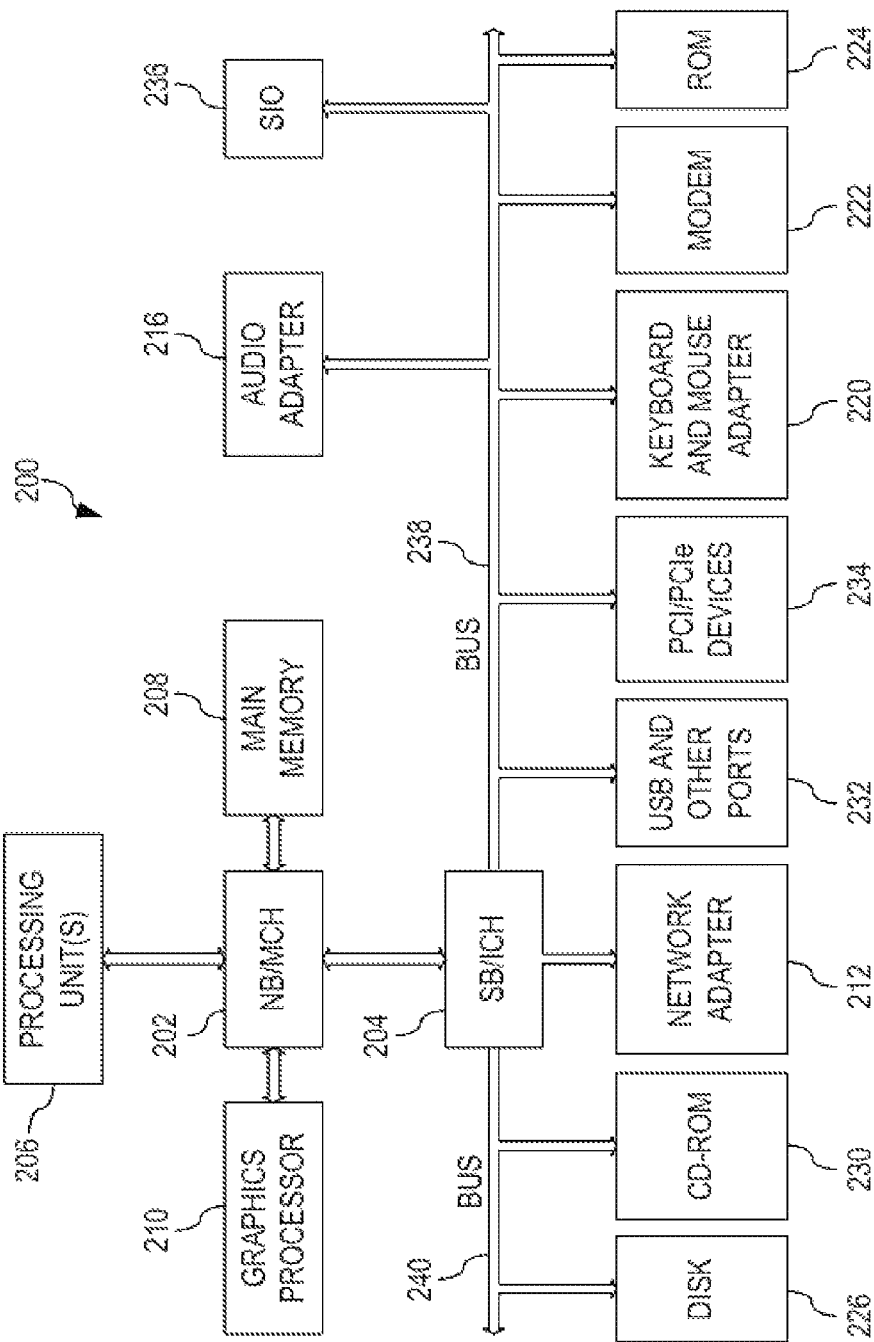
FIG. 2 is a block diagram of an example system in which aspects of the illustrative embodiments may be implemented.

FIG. 2 is a block diagram of an example system 200 in which aspects of the illustrative embodiments may be implemented. The system 200 is an example of a computer, such as client 110 in FIG. 1, in which computer usable code or instructions implementing the processes for illustrative embodiments of the present invention may be located.

In the depicted example, the system 200 employs a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter 212 connects to SB/ICH 204. An audio adapter 216, a keyboard and a mouse adapter 220, a modem 222, a read only memory (ROM) 224, a hard disk drive (HDD) 226, a CD-ROM drive 230, a universal serial bus (USB) port and other communication ports 232, and PCI/PCIe devices 234 connect to the SB/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDD 226 and CD-ROM drive 230 connect to the SB/ICH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be adapted to be stored by the storage devices and/or the main memory 208.

The processes for illustrative embodiments of the present invention may be performed by processing unit 206 using computer usable program code, which may be located in a memory, such as main memory 208, ROM 224, or in one or more peripheral devices 226 and 230.

A bus system, such as first bus 238 or second bus 240 shown in FIG. 2, may comprise one or more buses. The bus system may be implemented using any type of communication fabric or architecture that provides for a transfer of data between different components or devices attached to the fabric or architecture. A communication unit, such as the modem 222 or the network adapter 212 shown in FIG. 2, may include one or more devices used to transmit and receive data. A memory may be, for example, main memory 208, ROM 224, or a cache such as found in NB/MCH 202 shown in FIG. 2.

Those of ordinary skill in the art will appreciate that the hardware in FIG. 1 and FIG. 2 may vary depending on the implementation. Other internal hardware or peripheral devices, such as flash memory, equivalent non-volatile memory, or optical disk drives and the like, may be used in addition to or in place of the hardware depicted in FIG. 1 and FIG. 2. Also, the processes of the illustrative embodiments may be applied to a multiprocessor data processing system, other than the system mentioned previously, without departing from the spirit and scope of the present invention.

Moreover, the system 200 may take the form of any of a number of different data processing systems including client computing devices, server computing devices, a tablet computer, laptop computer, telephone or other communication device, a personal digital assistant (PDA), or the like. The system 200 may be a portable computing device that is configured with flash memory to provide non-volatile memory for storing operating system files and/or user-generated data. Thus, the system 200 may essentially be any known or later-developed data processing system without architectural limitation.

As detailed above, proposed embodiments provide a method and system for prioritizing the order of data transmission over a microservice mesh to enable destination nodes to start execution of their microservices as soon as possible, by predicting the data parameters that they will required based on their history of data access.

Figure 3:
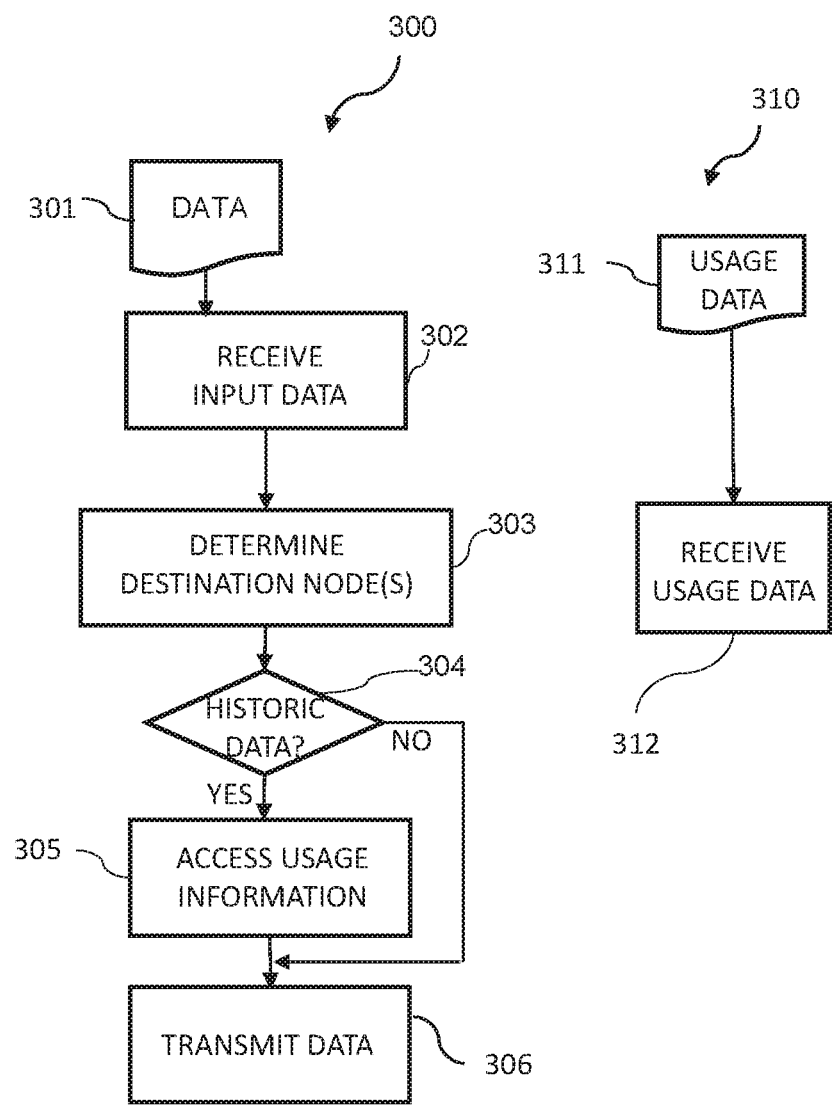
FIG. 3 a flow chart of processes performed at an originating node of a microservice mesh, in accordance with one embodiment of the present invention.
Figure 4:
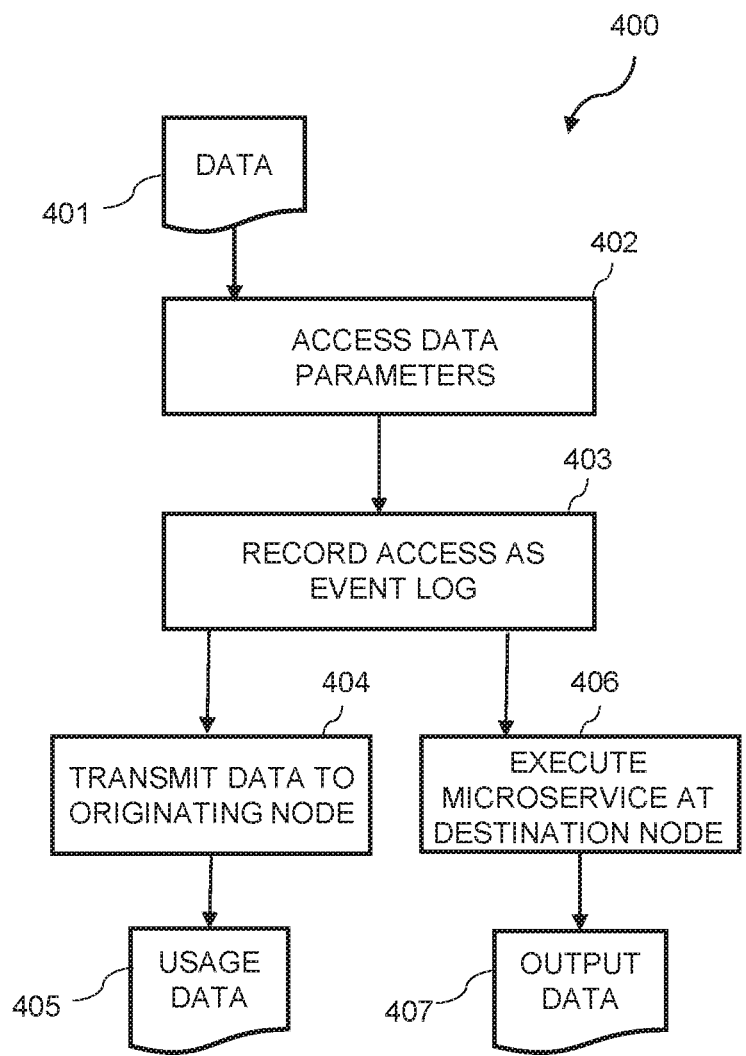
FIG. 4 is a flow chart of processes performed at a destination node of the microservice mesh, in accordance with one embodiment of the present invention.

Referring now to FIG. 3 and FIG. 4, an embodiment of processes performed at a node of a cluster of microservice nodes forming a service mesh will now be described. A service mesh and its architecture will then be described with reference to FIG. 5.

As shown in FIG. 3, processes 300 and 310 are performed in parallel at a node acting, at least for the time being, as an originating node for the transfer of information to other nodes over the service mesh.

An originating node receives, in step 302, input data 301 from the service mesh. In the example that the service mesh is an Istio™ mesh, which has sidecar proxies, such as Envoy sidecars, the node receives the input data at a sidecar proxy. The input data may originate from a gateway (not shown) to the service mesh, and may be provided by an application outside the service mesh that requires a service to be performed. The node then determines, from the input data, in step 303 the identities of one or more destination nodes for the transmission of the data over the service mesh. In the example of the sidecar proxy, this inspects the destination microservice proxy or queries the service mesh for the service destination.

The node then, in step 304, determines whether it has any historic usage data from the destination node or nodes. Such usage data, to be described below, will have been obtained from the destination nodes and stored at the originating node. If no such usage data is available, the process proceeds to the final step 306 of transmitting the data over the service mesh to the all the nodes on the service mesh, including the destination node or nodes. If such usage data is available, then in step 305 the node accesses the usage information for each individual destination node, and uses a predetermined algorithm to prioritize the order of the data parameters within the input data. The data parameters may be different types of data which are required to be used in the microservices, such that some but not necessarily all types will be needed for the execution of a given microservice. Examples of the data parameters may be the fields of personal data for a consumer of a bank or a store (for example the consumer's name, address, bank account number, telephone number, and credit status) and the details of an order for supply of goods or services (such as the order number, consumer account number, and date).

The prioritization algorithm takes account of whether there is just one destination node or more than one, to optimize the process for the earliest possible execution of the microservices in the mesh. If there is only one destination node, then the algorithm orders the data parameters according to their history of usage at that node, prioritizing the parameters that have been used, i.e., that have been accessed by an application at that node. This ensures that the microservice may start to execute as early as possible, by sending it the data it requires as early as possible, and before transmitting any data that it is unlikely to need. Depending on the accuracy of the historic data and the extent to which it matches the current version of the destination microservice, this will optimize the speed of execution of the micro service.

If there is more than one microservice destination, then the algorithm uses the historic usage for all of them, to the extent that such information is available. It prioritizes the data parameters, according to the likelihood that they will be needed by the destination nodes and according to the number of such nodes that are likely to need each data parameter. The data parameters that are likely to be required at the most nodes will be given priority. However, it will be understood that this is only one example, and that more complex algorithms may be used, based on the requirements of the nodes for executing the microservices.

Once prioritized in step 305, the data are transmitted in step 306.

In parallel to the process 300, process 310 is performed by each originating node. The node receives, in step 312, usage data 311 as described above from each destination node to which the originating node has transmitted data for the execution of a microservice. It stores and periodically updates this usage data as the historic usage data to be used in step 305.

In the embodiment that the service mesh is an Istio™ mesh, the step 306 comprises sending the data from the originating microservice via the Envoy sidecar process. The sidecar process inspects, in step 303, the destination service or queries the mesh for the service destination. If step 304 determines that statistics are available for historic data usage, the sidecar process reorders the data is step 305; for example, the address field of a consumer's profile is moved to the front of the consumer data, ready for immediate access by the receiving service. Once re-ordered, the data is sent to the destination service as normal.

A destination node carries out the process 400 shown in FIG. 4. The destination node receives input data 401 over the service mesh from an originating node, and in step 402 it accesses the data parameters that it requires from that input data, for the execution of its specific microservice. It then, in step 403, records its access of each data parameter, in effect as an event log, to act as specific usage data. It transmits this usage data 405 in step 404 over the service mesh to the originating node from which it received the input data 401; this usage data may then become the usage data 311 of FIG. 3 for that node.

The destination node, in step 406, executes its own microservice on the relevant data parameters, as soon as it determines that it has obtained all the parameters that it needs. It outputs as output data 407 the results of the execution of the microservice, and the originating node receives these output data over the service mesh.

In the embodiment that the service mesh is an Istio™ mesh, a Liberty server at the destination node may receive the input data in step 402. Step 403 then may include the step of the Liberty web or CDI container creating a data proxy for each data parameter received. The data required at the node is retrieved via methods on the proxy. Each proxy has a link back to the Envoy sidecar process to which it reports the data access. Once the execution process of step 406 is complete, the sidecar adds data access statistics to the headers returned to the calling service, i.e., to the originating node, which then collates the statistics for which data is accessed by which services.

The execution of data processing tasks on a set of input data may be distributed to multiple processor nodes in a cluster for greater efficiency, resilience and ease of maintenance. The nodes are arranged each to perform a microservice, and the microservices are arranged to communicate with each other. The service mesh is a software layer that handles service-to-service communication and can act as a proxy that intercepts the network communication. Service mesh is an example of the Ambassador pattern, a helper service that sends network requests on behalf of an application. Service meshes in Kubernetes® may typically be Liberty™ and Istio™. These both provide circuit breaking, by which a service mesh temporarily marks an instance as unavailable after it has failed a number of requests with retries and then tries the instance again after a backoff period. They both also provide for the capturing of metrics about service calls, such as request volume, latency, error and success rates and response sizes. The service mesh may also enable distributed tracing by adding correlation information for each hop in a request.

Figure 5:
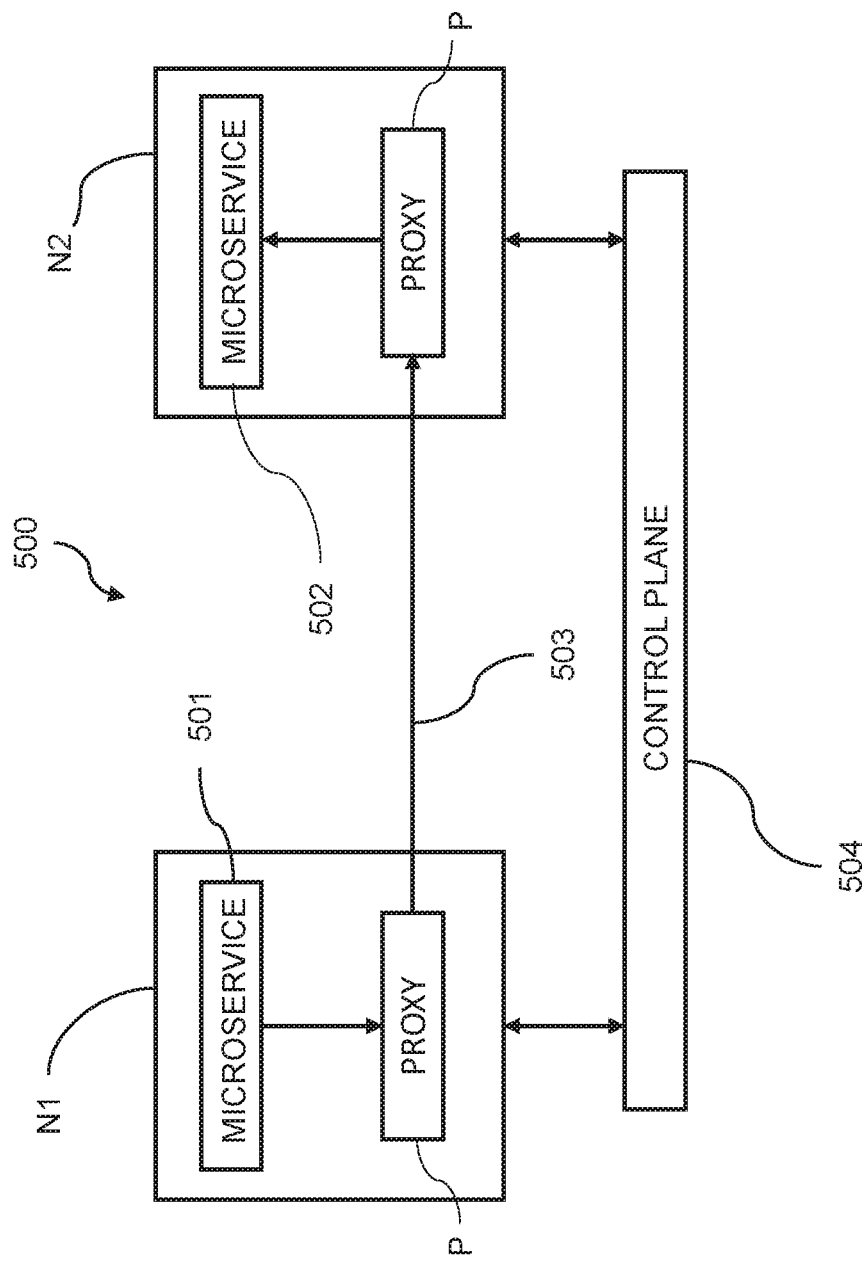
FIG. 5 is a block diagram of part of a microservice mesh, in accordance with one embodiment of the present invention.

As shown in FIG. 5, a service mesh 500 comprises at least two nodes N1 and N2 for executing specific microservices locally. In practice, there may be many such nodes, and some of these nodes may perform the same microservice. Generally, the nodes will require different sets of input data, i.e., different data parameters, to be able to start execution of their microservices. Until they are able to start, they may be blocked by control programs.

In common with the known Istio™ service mesh architecture, the mesh has a data plane represented logically by microservices 501 and 502, and associated Envoy sidecar proxies P which are linked by communications links 503 with protocols such as HTTP/1.1, HTTP/2, gRPC, or TCP, with or without mTLS. The intelligent proxies mediate and control all network communication between the microservices, and may cooperate with policy and telemetry control hubs. A logical control plane manages and configures the proxies to route traffic. In FIG. 5, the control plane is represented by a control plane API 504. There may typically be Mixer components in the control plane which enforce access control and usage policies across the mesh, and collect telemetry data from the Envoy processes and other services. The Envoy proxy P at each node can extract request level attributes and send them to Mixer for evaluation. A flexible plug-in model included in Mixer enables Istio™ to interface with a variety of host environments and infrastructure back-ends. Therefore, Istio™ enables to abstract the Envoy proxy and Istio-managed services from these details.

The control plane may also comprise Pilot™ which provides service discovery for the Envoy sidecars, traffic management for intelligent routing such as A/B tests and canary deployments, and resiliency such as timeouts, retries and circuit breakers. Pilot™ converts high level routing rules that control traffic behavior into Envoy-specific configurations and propagates them to the Envoy sidecars at runtime. Pilot™ abstracts platform-specific service discovery mechanisms and synthesizes them into a standard format that any sidecar conforming with the Envoy data plane APIs can consume. This loose coupling allows Istio™ to run on multiple environments such as Kubernetes®, Consul and Nomad, while maintaining the same operator interface for traffic management.

It will be understood from the above description of service mesh functionality and architecture that the existing meshes may be leveraged to create data proxies for respective data parameters, and use them to generate the data usage information 311 and 405. Further, the sidecars may be used to perform the prioritization of the order of data parameter transmission of step 305 shown in FIG. 3.

In another embodiment, the network shown in FIG. 5 may comprise multiple nodes, including nodes N1 and N2, over the same service mesh. The mesh is configured to perform data processing tasks on input data from a gateway (not shown) as a series of microservices performed sequentially in hops, as referred to above in relation to the capturing of metrics in Istio™ meshes. The first task is performed at a first destination node, and this then becomes an originating node. As an originating node, it outputs the result of its own microservice as a new request for a second destination node. The second destination node receives this new request including input data that may include the data that was generated by the execution of the first task. The transmission from the first destination node to a second destination node is the second hop, and the second destination node performs a second task as its microservice. This overall process may continue, over multiple hops and corresponding tasks at different nodes, until the overall service comprising multiple tasks has been completed, and the results output back to the gateway.

In common with the process of FIG. 3 and FIG. 4 and the mesh of FIG. 5, the destination nodes return data usage information to respective originating nodes, and the originating nodes use this to prioritize the order of parameters in the data that are transmitted.

Figure 6:
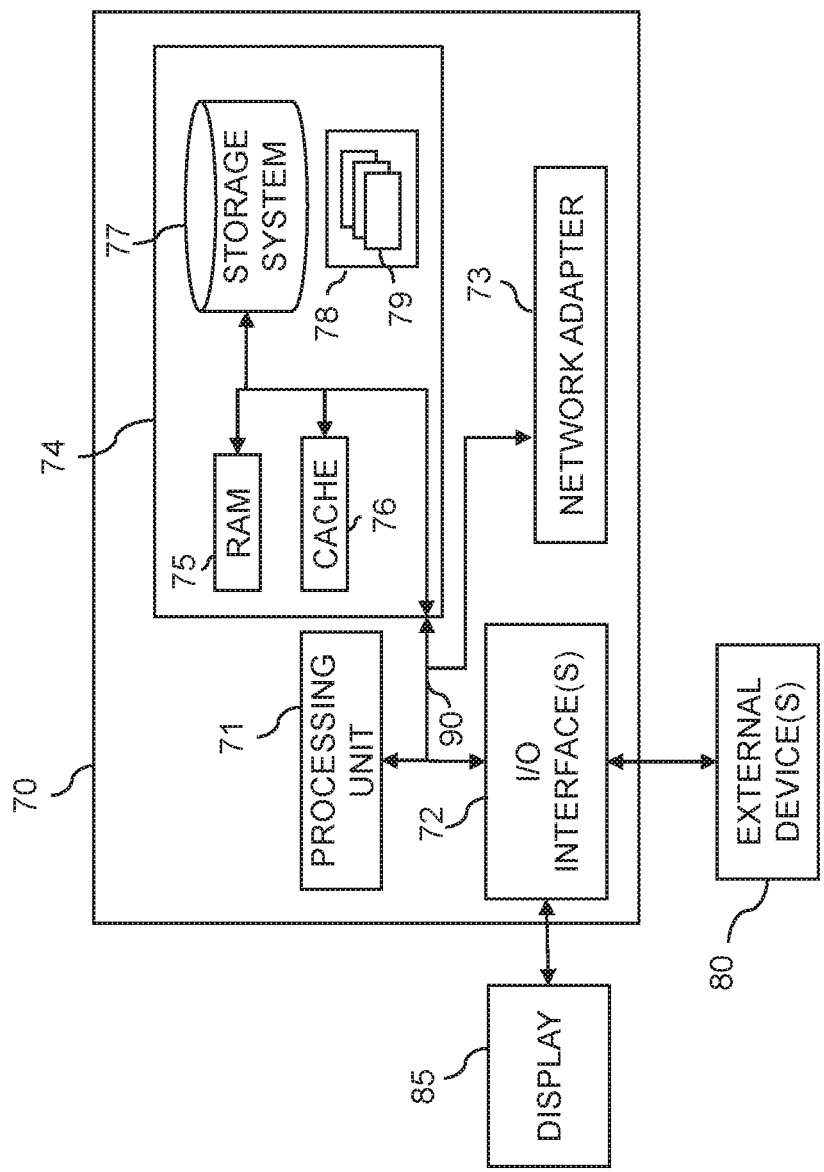
FIG. 6 is a diagram of a computer/server system, in accordance with one embodiment of the present invention.

Embodiments may comprise a computer system 70 illustrated in FIG. 6, which may form part of a networked system. The components of computer system/server 70 may include, but are not limited to, one or more processing arrangements, for example comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such media may be any available media that is accessible by computer system/server 70, and it includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. It should be understood that although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The steps of the method therefore reflect various parts of a computer program, e.g. parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for controlling data communication between microservices across a service mesh of microservice nodes, the method comprising:
   at a destination microservice node for performing an associated service for an originating microservice node, controlling an associated destination program to generate data usage information at the destination microservice node;
   transmitting, across the service mesh, the data usage information from the destination program to an originator program associated with the originating microservice node;
   controlling the originator program to determine, for the destination microservice node, a priority order of input data based on the data usage information; and
   transmitting, across the service mesh, the input data in the priority order from the originator program to the destination microservice node for performing the associated service on the input data.

2. The method of claim 1, wherein each microservice node of the service mesh is selectively operable as the originating microservice node and as the destination microservice node, wherein the method comprises the originating microservice node receiving across the service mesh the data usage information from each destination program to which it has sent input data, and determining the priority order of the input data for each respective destination program.

3. The method of claim 2, comprising the originator program updating, for each individual destination microservice node, the priority order, based on updated data usage information relating to use of data by the destination microservice node.

4. The method of claim 1, wherein the input data comprises data parameters relating to different respective attributes of a consumer for whom services are performed by the service mesh, wherein the originator program transmits the input data with the data parameters in the priority order based on the data usage at the destination microservice node of those data parameters.

5. The method of claim 1, wherein the input data comprises different data parameters and the destination microservice node creates a data proxy for each of the data parameters, wherein the method comprises data proxy recording any access by the destination microservice of its respective data parameter, the associated destination program using data proxies to generate the data usage information relating to data access requirements at the destination microservice node.

6. The method of claim 1, wherein the originator program determines identities of one or more destination microservice nodes to which the input data is to be transmitted for performance of a microservice, by inspecting the input data or by querying the service mesh.

7. A computer-implemented method performed by a destination microservice node in a cluster of microservice nodes forming a service mesh, the method comprising:
   a destination program of the destination microservice node generating data usage information relating to its access of input data comprising specific different data parameters received across the service mesh from an originator program of an originating microservice node, wherein the usage information is based on the access of the different data parameters; and
   the destination program transmitting, across the service mesh, the data usage information to the originator program.

8. The method of claim 7, wherein the destination microservice creates a data proxy for each of the data parameters, wherein the method comprises each data proxy recording any access by the destination microservice of its respective data parameter, the destination program using data proxies to generate the data usage information at the destination microservice.

9. The method of claim 7, wherein the data parameters are different respective attributes of a consumer for whom services are performed by the service mesh.

10. A computer-implemented method performed by an originating microservice in a cluster of microservice nodes forming a service mesh, the method comprising:
    an originator program of the originating microservice receiving, across the service mesh from a destination program of a destination microservice, data usage information relating to access of input data comprising specific different data parameters received by the destination program from the originator program, the usage information based on the access of the different data parameters;

the originator program determining, for the destination microservice, a priority order of input data parameters based on the data usage information; and the originator program transmitting, across the service mesh, the input data in the priority order to the destination program for performing associated service on the input data.

11. The method of claim 10, wherein the data parameters are different respective attributes of a consumer for whom services are performed by the service mesh.

12. A computer program product comprising a non-transitory computer readable storage medium having program instructions embodied therewith, the program instructions executable by a processing unit to cause the processing unit to perform:

at a destination microservice node for performing an associated service for an originating microservice node, control an associated destination program to generate data usage information at the destination microservice node;

transmit, across a service mesh, the data usage information from the destination program to an originator program associated with the originating microservice node;

control the originator program to determine, for the destination microservice node, a priority order of input data based on the data usage information; and transmit, across the service mesh, the input data in the priority order from the originator program to the destination microservice node for performing the associated service on the input data.

13. The computer program product of claim 12, wherein each microservice node of the service mesh is selectively operable as the originating microservice node and as the destination microservice node, wherein the computer program product comprises the program instructions executable by a processing unit to cause the processing unit to perform:

receive, by the originating microservice node, across the service mesh the data usage information from each destination program to which it has sent input data; and determine a priority order of the input data for each respective destination program.

14. The computer program product of claim 13, wherein the computer program product comprises the program instructions executable by a processing unit to cause the processing unit to perform: update, by the originator program, for each individual destination microservice node, the priority order, based on updated data usage information relating to the use of data by the destination microservice node.

15. The computer program product of claim 12, wherein the input data comprises data parameters relating to different respective attributes of a consumer for whom services are performed by the service mesh, wherein the originator program transmits the input data with the data parameters in the priority order based on the data usage at the destination microservice node of those data parameters.

16. The computer program product of claim 12, wherein the input data comprises different data parameters and the destination microservice node creates a data proxy for each of the data parameters, wherein the computer program product comprises the program instructions executable by a processing unit to cause the processing unit to perform:

record, by each data proxy, any access by the destination microservice of its respective data parameter; and use, by the associated destination program, data proxies to generate the data usage information relating to data access requirements at the destination microservice node.

17. The computer program product of claim 12, wherein the originator program determines identities of one or more destination microservice nodes to which the input data is to be transmitted for performance of a microservice, by inspecting the input data or by querying the service mesh.

18. A computer network comprising:

microservice nodes configured to communicate across a service mesh, the microservice nodes being configurable as originating microservice nodes and as destination microservice nodes;

each destination microservice node being configured to:
perform an associated service for an originating microservice node;
control an associated destination program to generate data usage information at the destination microservice node; and
transmit, across the service mesh, the data usage information from the destination program to an originator program associated with the originating microservice node;

each originating microservice node being configured to:
control the originator program to determine, for the destination microservice node, a priority order of input data based on the data usage information; and
transmit, across the service mesh, the input data in the priority order from the originator program to the destination microservice node for performing the associated service on the input data.

19. The computer network of claim 18, wherein each microservice node of the service mesh is selectively operable as the originating microservice node and as the destination microservice node, wherein the computer network comprises program instructions executable by a processing unit to cause the processing unit to perform:

receive, by the originating microservice node, across the service mesh the data usage information from each destination program to which it has sent input data; and determine a priority order of the input data for each respective destination program.

20. The computer network of claim 19, wherein the computer network comprises the program instructions executable by a processing unit to cause the processing unit to perform: update, by the originator program, for each individual destination microservice node, the priority order, based on updated data usage information relating to the use of data by the destination microservice node.

21. The computer network of claim 18, wherein the input data comprises data parameters relating to different respective attributes of a consumer for whom services are performed by the service mesh, wherein the originator program transmits the input data with the data parameters in the priority order based on the data usage at the destination microservice node of those data parameters.

22. The computer network of claim 18, wherein the input data comprises different data parameters and the destination micro service node creates a data proxy for each of the data parameters, wherein the computer network comprises program instructions executable by a processing unit to cause the processing unit to perform:

record, by each data proxy, any access by the destination microservice of its respective data parameter; and use, by the associated destination program, data proxies to generate the data usage information relating to data access requirements at the destination microservice node.

23. The computer network of claim 18, wherein the originator program determines identities of one or more destination microservice nodes to which the input data is to be transmitted for performance of a microservice, by inspecting the input data or by querying the service mesh.

\* \* \* \* \*